United States Patent [19]

Hart

[11] 4,124,741

[45] Nov. 7, 1978

[54] HYDROGEN/CHLORINE ELECTROCHEMICAL ENERGY STORAGE SYSTEM

[75] Inventor: Thomas G. Hart, Royal Oak, Mich.

[73] Assignee: Energy Development Associates, Madison Heights, Mich.

[21] Appl. No.: 774,700

[22] Filed: Mar. 4, 1977

[51] Int. Cl.$^2$ .............................................. C25B 11/12
[52] U.S. Cl. ....................................... 429/105; 55/74; 204/128; 204/129; 206/0.7
[58] Field of Search ................ 204/128, 129; 429/105; 206/0.7; 55/74

[56] References Cited

U.S. PATENT DOCUMENTS

| 1,746,542 | 2/1930 | Low | 204/128 |
| 1,847,435 | 3/1932 | Low | 204/128 |
| 2,583,098 | 1/1952 | Heise et al. | 204/128 |
| 3,772,085 | 11/1973 | Bjorkman | 429/105 |

FOREIGN PATENT DOCUMENTS

| 14,485 of | 1884 | United Kingdom | 429/105 |
| 188,665 | 10/1923 | United Kingdom | 206/.7 |

*Primary Examiner*—R. L. Andrews
*Attorney, Agent, or Firm*—Stanley H. Lieberstein

[57] ABSTRACT

A HCl electrochemical energy storage system comprises a cell having therein an aqueous HCl electrolyte in which at least a portion of the HCl is present in disassociated form and an electrode of ungraphitised carbon, and communicating with said cell, at least one member of the group of means for storing hydrogen and means for storing chlorine, said means for storing hydrogen comprising graphitised carbon, and said means for storing chlorine comprising ungraphitised carbon.

15 Claims, No Drawings

4,124,741

HYDROGEN/CHLORINE ELECTROCHEMICAL ENERGY STORAGE SYSTEM

BACKGROUND OF THE INVENTION

In any electrochemical reaction, the driving force, i.e. the voltage, is greater than the theoretically necessary voltage and the additional amount of voltage required is known as an overvoltage. Many methods have been used in the past to reduce overvoltage including the use of depolarizers and various structural devices. The problem, however, is complicated because there is an overvoltage associated with each of the gases liberated during the electrochemical reaction. One such electrochemical energy storage system is based on electrolyzing aqueous hydrogen chloride.

The use of carbon electrodes, i.e., electrodes manufactured from carbon, graphite, activated graphite, and the like is desirable because of a combination of their relatively low cost and availability. Unfortunately, such carbon electrodes have a significant chlorine overvoltage. In copending application Ser. No. 761,722, filed Jan. 24, 1977, a method of considerably and premanently decreasing the oxidation and reduction chlorine overvoltages of such carbon electrodes is disclosed. The method involves contacting the electrode with nitric acid for an effective overvoltage reducing length of time, generally 10 to 1200 hours, preferably 80 to 800 hours, and most preferably 400 to 700 hours. The nitric acid is preferably concentrated nitric acid and is most preferably boiling B-constant nitric acid. The disclosure of the copending application is hereby incorporated into this disclosure as if fully set forth here.

A means of further reducing the chlorine overpotential in an HCl electrochemical energy storage system in which the aqueous HCl electrolyte contains at least a portion of the HCl in disassociated form has been discovered and, further, new methods of storing the hydrogen and chlorine by-products of the system has also been discovered. Accordingly, it is the object of this invention to provide a means for decreasing the chlorine overvoltages in such a system and means for storing the hydrogen and chlorine by-products. This and other objects of the invention will become apparent to those skilled in the art from the following detailed description.

SUMMARY OF THE INVENTION

This invention relates to a method of decreasing the chlorine overvoltages of carbon electrodes in a HCl electrochemical system in which a portion of the HCl is disassociated from the water, and means to store the hydrogen and chlorine by-products of such a system, through appropriate use of graphitised or ungraphitised carbon.

DESCRIPTION OF THE INVENTION

The present invention is based on the differences in behavior of graphitised and ungraphitised carbon electrodes when used in connection with a hydrochloric acid electrolyte. The performance of such electrodes are very similar in hydrochloric acid when the concentration is below about 20% but are sharply different when the concentration is above 20%. The chlorine overpotential behavior difference is evidenced by measuring the anodic chlorine overpotential in millivolts employing 10 milliamps per square centimeter current density. Using an ungraphitised carbon electrode, the overpotential is substantially constant, being about 7 millivolts at 5% HCl concentration and rises in a substantially uniform manner as the HCl concentration is increased to about 8 mv at 37% HCl concentration. A graphitised carbon electrode exhibits an anodic chlorine overpotential of about 5 mv over an HCl concentration range between 5 and about 18%. As the HCl concentration is thereafter increased, the graphitised carbon shows a very sharp anodic chlorine overpotential rise reaching about 45 mv at about 24% concentration. As the HCl concentration is then increased, the graphtised carbon shows an overpotential of about 45-46 mv through the 24-37% HCl concentration range. The foregoing behavior of the graphtised and ungraphitised carbon electrodes has been observed to be independent of the current density.

In addition to the sharp overpotential/concentration inflection that occurs at about 20% with the graphitised carbon electrodes, hysteresis effects were invaribly observed, particularly at low current densities. The hysteresis effects were markedly absent in the ungraphitised electrodes even at the highest acid concentrations and even at the lowest current density.

It is believed that the foregoing behavior is the result of unassociated hydrogen chloride such as may be present in water mixture, commonly termed hydrochloric acid, being strongly absorbed into graphitised carbon so as to effect the chlorine overvoltage. This was substantiated as follows. Hydrochloric acid of about 20 weight percent HCl and 80 weight percent water was boiled for about four hours to bring the mixture into the exactly the constant boiling porportions. The chlorine overpotentials of graphitised and ungraphitised carbon was then measured in the boiled acid and were 6 and 8 mv respectively. Then about 50 grams per liter of titanium tetrachloride (which is well known to disassociate some HCl from the constant boiling hydrogen chloride/water mixture) was added to the boiled acid mixture and the overpotentials were again measured. The graphitised carbon overpotential had risen from about 6 mv to about 39 mv. However, the anodic overpotential of the ungraphitised carbon electrode had only risen from about 8 mv to about 9 mv. Then, about 100 grams of water per liter were added to the hydrochloric acid mixture containing the titanium tetrachloride thereby reducing the hydrogen chloride proportion to about 18 weight percent and it was found that the overpotentials were both electrodes and reverted to about their original values, i.e., 6 and 8 mv, respectively. All of the measurements were made at a current density of 10 milliamps per square centimeter.

It has further been observed that the ability of electrolytes to wet graphitised carbon is strongly influenced by the presence of hydrogen in the electrolyte. In some instances, in sodium chloride, for example, the presence of hydrogen completely prevents the passage of electrolyte through porous graphitised carbon at reasonable entry pressures, indicating completely non-wetting. On the other hand, the wetting properties of ungraphitised carbon are affected very little by the presence of hydrogen in the electrolyte. Accordingly, the sharp decline in wetting properties of graphitised carbon because of the hydrogen in the water based electrolyte is due to the strong preferential adsorption of hydrogen into the graphitised carbon.

Additionally, the amount of chlorine removed from a circulating electrolyte containing dissolved chlorine by ungraphitised carbon is many times greater than that removed by graphitised carbon. However, the overpotential measurements described above show that despite the larger amount of chlorine adsorbed by ungraphitised carbon, the effect on chlorine overvoltage, both anodic and cathodic, is much less that the effect of a smaller amount of adsorbed chlorine on the chlorine overvoltage of graphitised carbon. Where pressures and temperatures are such that liquid chlorine is present, the foregoing effects of the chlorine adsorption on the carbon electrode overvoltage are more pronounced, and additionally, some instability is observed in the overpotentials of the graphitised carbon.

The foregoing observations and discussion has the following practical implications:

Firstly, in systems where the hydrochloric acid concentration exceeds the constant boiling concentration (about 20 percent by weight, depending on the amount of disassociating additives such as titanium tetrachloride), graphitised carbon electrodes result in very high overvoltage inefficiencies and ungraphitised carbon electrodes are therefore much preferred. This preference extends also to carbon electrodes which have been catalyzed in the known manner with known catalysts such as the noble metals. For example, it has been found that platinized, ungraphitised carbon results in much lower overvoltages than platinized, graphitised carbon.

Secondly, in systems where hydrogen storage is required, the storage can be accomplished by hydrogen adsorbtion into graphitised carbon. Such adsorptive storage of hydrogen in graphitised carbon has a great advantage over the known storage means, such as storage in iron-titanium hydride, for example, because it is not effected by exposure to and contact with the hydrochloric acid electrolyte.

Thirdly, in systems where chlorine storage is required, for example, as liquid chlorine, safety and other advantages accrue from adsorbing the chlorine on ungraphitised carbon, with consequent modification in the pressure/temperature relationships controlling storage and release.

Fourthly, in systems where the hydrochloric acid concentration does not exceed the constant boiling concentration but where the temperature/pressure relationship dictates the formation of liquid chlorine, graphitised carbon electrodes result in high and unstable overvoltages and, therefore, ungraphitised carbon electrodes are much preferred.

The prolonged nitric acid treatment of carbon electrodes which results in sharp reduction of chlorine overvoltages, which has been referred to hereinbefore, does not change but rather pronounces all of the characteristic performances which have been described above. For example, the adsorptive capacity of graphitised carbon for hydrogen chloride, of graphitised carbon for hydrogen, and of ungraphitised carbon for chlorine, are all greatly increased by the prolonged nitric acid treatment of the carbon electrodes.

The experimental date set forth above was obtained using Airco Speer Grade 37C ungraphitised carbon and Airco Speer Grade 37G graphitised carbon, the latter being made by graphitising the former. Graphitising is the process of prolonged heating at very high temperatures in a controlled atmosphere. The very high temperatures are generally above 2,000° C at which the carbon allotropic form is converted to the graphite allotropic form at practical rates. Substantially indentical results to that achieved with the Airco Speer material has also been obtained using Union Carbide Grade PG60 graphitised carbon and its ungraphitised counterpart.

The use of high HCl concentrations in HCl electrochemical energy storage systems has generally been avoided because the electrodes are substantially unstable in such a system. It has been found that the ungraphitised carbon electrodes, whether catalyzed or uncatalyzed are sufficiently stable to be of practical use in an aqueous HCl electrolyte of any concentration including concentrations when at least a portion of the HCl is not associated with the water.

Various changes and modifications can be made in the present invention without departing from the spirit and scope thereof. The various embodiments disclosed herein were for the purpose of further illustrating the invention but were not intended to limit it. For example, it will be recognized that the non-halogen electrode need not be a carbon electrode but can be any other known material.

I claim:

1. An HCl electrochemical energy storage system comprising a cell having therein an aqueous hydrochloric acid electrolyte in which at least a portion of the HCl is present in disassociated form and an electrode therein of ungraphitised carbon, and a non-halogen electrode, and communicating with said cell, means for storing hydrogen comprising graphitised carbon.

2. The electrochemical energy storage system of claim 1 wherein said electrolyte has a HCl concentration of at least about 20 percent.

3. The electrochemical energy storage system of claim 2 wherein said ungraphitised carbon electrode is a platinized ungraphitized carbon electrode.

4. The electrochemical storage system of claim 3 wherein said electrolyte contains a disassociating amount of an HCl disassociating agent.

5. The electrochemical storage system of claim 4 wherein said disassociating agent is titanium tetrachloride.

6. The electrochemical storage system of claim 1 wherein said electrolyte contains an effective disassociating amount of a HCl disassociating agent.

7. The electrochemical energy storage system of claim 6 wherein said agent is titanium tetrachloride.

8. The electrochemical energy storage system of claim 1 wherein said system contains means for storing chlorine comprising ungraphitised carbon communicating with said cell.

9. The electrochemical energy storage system of claim 1 wherein said carbon electrode has previously been subjected to prolonged contact with nitric acid.

10. A HCl electrochemical energy storage system comprising a cell having therein an aqueous hydrochloric acid electrolyte in which at least a portion of the HCl is present in disassociated form and at least one ungraphitised carbon electrode and a non-halogen electrode wherein said electrolyte contains an effective disassociating amount of a HCl disassociated agent.

11. The electrochemical energy storage system of claim 10 wherein said agent is titanium tetrachloride.

12. A method of storing hydrogen which comprises adsorbing the hydrogen in graphitised carbon.

13. An HCl electrochemical energy storage system comprising a cell having therein an aqueous hydrochloric acid electrolyte in which at least a portion of the HCl is present in disassociated form and an electrode therein of ungraphitised carbon and a non-halogen electrode, and communicating with said cell, means for storing chlorine comprising ungraphitised carbon, wherein said electrolyte contains a disassociating amount of an HCl disassociating agent.

14. The electrochemical energy storage system of claim 13 wherein said electrolyte has an HCl concentration of at least about 20%.

15. The electrochemical energy storage system of claim 14 wherein said disassociating agent is titanium tetrachloride.

* * * * *